Feb. 2, 1960   E. W. SIMONS   2,923,506
MIRROR SUPPORT
Filed Aug. 29, 1958   2 Sheets-Sheet 1
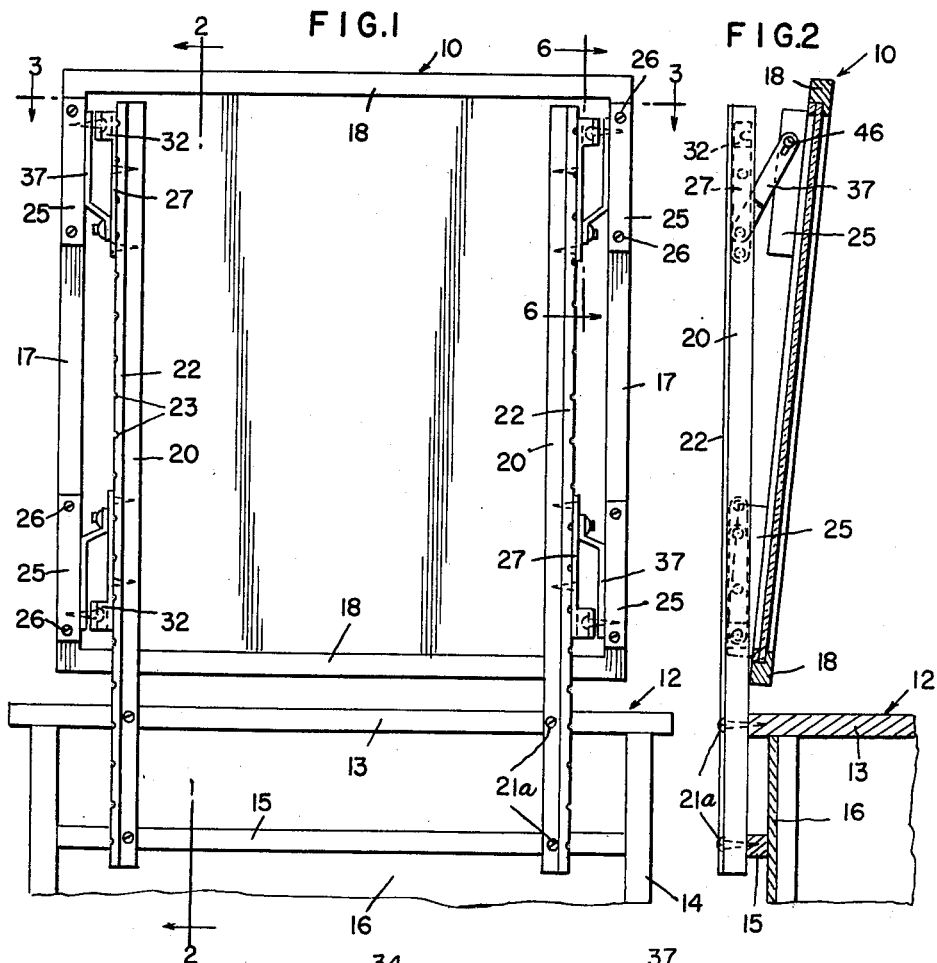
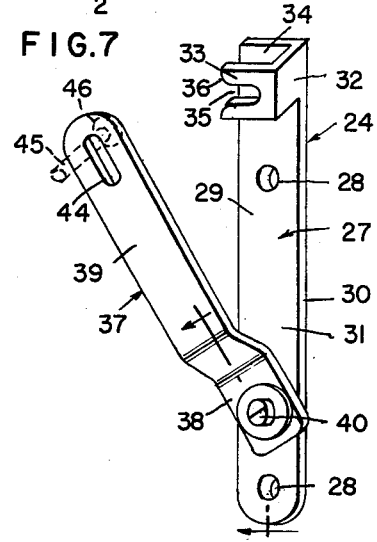
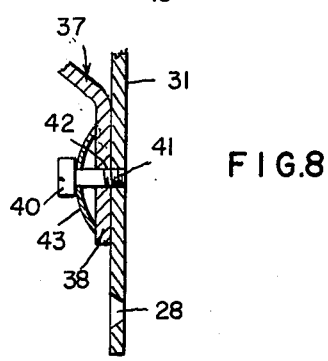
INVENTOR.
Elizabeth W. Simons
BY Shoemaker + Mattare
ATTYS

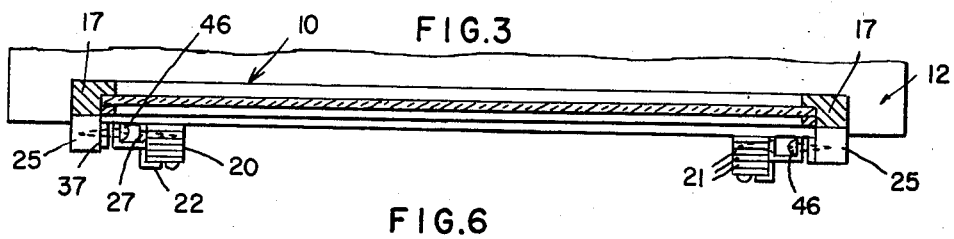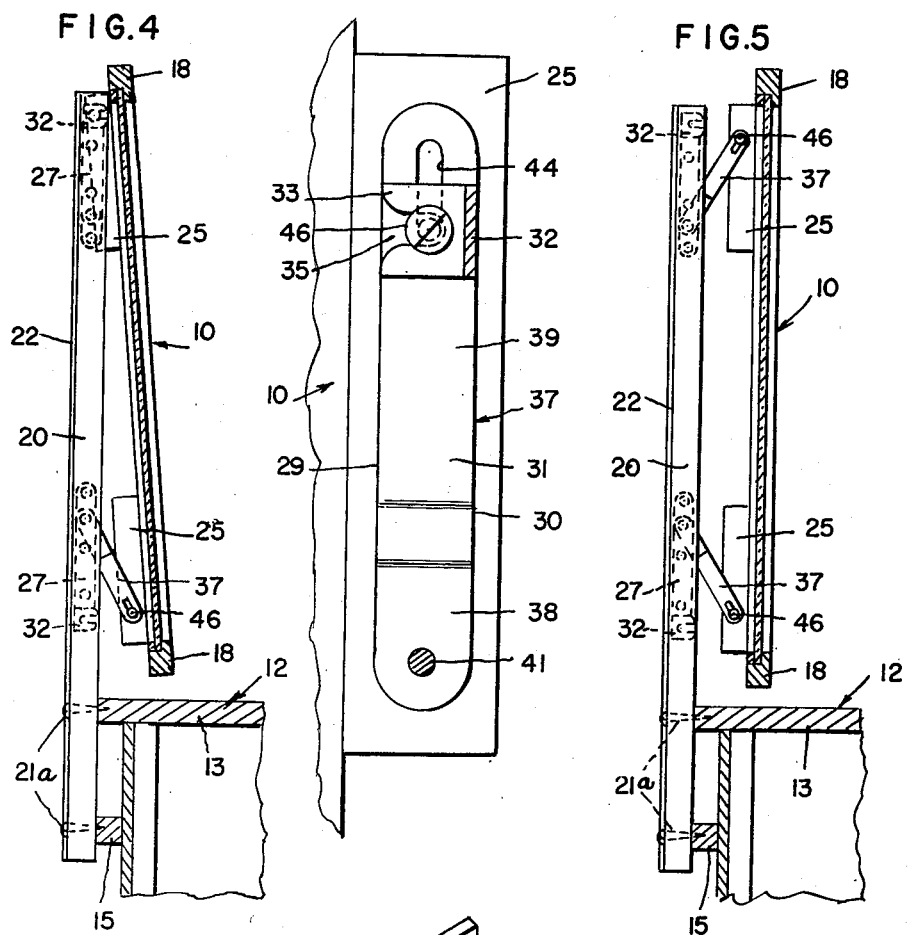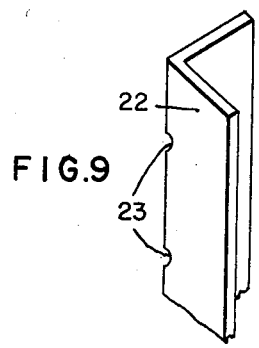

United States Patent Office 2,923,506
Patented Feb. 2, 1960

2,923,506

MIRROR SUPPORT

Elizabeth W. Simons, Greensboro, N.C.

Application August 29, 1958, Serial No. 758,147

13 Claims. (Cl. 248—28)

This invention relates generally to supporting devices and is directed particularly to improvements in supports for mirrors and like bodies which are mounted for use upon an article of furniture, such as a bureau, dressing table or the like.

Mirror supports of various types have, of course, been heretofore designed which operate to maintain a mirror upon vertical supports or upright standards carried by dressers and other articles of furniture, but such prior devices have suffered from certain drawbacks such, for example, as being of relatively complicated construction necessitating the use of an excessive amount of material and requiring a lot of machining and hand operations in their construction, or they have been of such design that they may not be entirely relied upon to maintain the mirror in a set position to which it might be moved or adjusted for use.

It is accordingly a particular object of the present invention to provide an improved mirror supporting means whereby the deficiencies of prior art devices, such for example, as those enumerated above, are eliminated or overcome.

More particularly, an object of the present invention is to provide an improved mirror supporting means which is of relatively simple construction and which may, therefore, be economically produced.

Still another object of the invention is to provide an improved mirror supporting device which is employed between the upper and lower parts of the side members of a mirror frame and adjacent supporting standards and wherein such device in its multiple application to the mirror and the standards will permit the mirror to be set back or set forward in a vertical position or permit the top part of the mirror to be tipped or swung forwardly so that the mirror may be inclined from the top forwardly, or permit the bottom of the mirror to be swung forwardly so that the mirror may be inclined from the top rearwardly.

Still another object of the invention is to provide a mounting device which will permit a mirror to be disposed in the different positions above enumerated and which will also prevent the mirror from slipping or dropping from any one of the positions in which it may be placed so that after being set in a desired position, any push or pull which might be applied thereto, as by a child, for example, will not result in the mirror changing its position in any way which might endanger the child or other person involved.

Still another object of the invention is to provide a mounting unit of the character stated which is so designed that it can and is adapted to be attached to a mirror to couple the same with a support or supporting standards, in two positions, one position being a direct reversal of the other, and as a result of which placement of the units in the two positions, one reversed with respect to the other, and because of the novel design of the supports, the mirror or similar structure can be adjusted to, and held against accidental movement from, any one of the selected positions described.

The invention will be best understood from a consideration of the following detail description taken in connection with the accompanying drawings forming part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Fig. 1 is a view in rear elevation of a mirror and the upper part of a supporting article of furniture, showing the invention herein applied to the mirror and to upright supports secured to the furniture body;

Fig. 2 is a vertical sectional view taken substantially on the line 2—2 of Fig. 1 and showing the forward tilted position of the mirror;

Fig. 3 is a transverse section taken in a horizontal plane substantially on the line 3—3 of Fig. 1;

Fig. 4 is a sectional view in a vertical plane corresponding to Fig. 2 but showing the top of the mirror tipped or tilted rearwardly;

Fig. 5 is a sectional view taken in a vertical plane corresponding to Figs. 2 and 4 and showing the mirror adjusted to a forward position with respect to the supporting standards;

Fig. 6 is a section taken in a vertical plane substantially on the line 6—6 of Fig. 1;

Fig. 7 is a view in perspective of the supporting hinge unit and illustrating in dotted lines the position occupied by a headed stud carried by the mirror and coupled with the pivoted arm of the unit;

Fig. 8 is a sectional view on an enlarged scale taken substantially on the line 8—8 of Fig. 7; and Fig. 9 is a view in perspective of a portion of one end of a standard reinforcing angle bar.

Referring now more particularly to the drawings, there is illustrated in Fig. 1 a rear elevation or rear view of a framed body such as a mirror or the like, together with the upper portion of an article of furniture such as a dressing table, bureau or the like, the rear or back of which is also shown. The mirror or other framed body is here designated 10 while the article of furniture is generally designated 12 and the latter may embody or comprise the top 13, the rear corner posts 14, which, of course, provide at their lower ends the usual supporting feet or legs, not shown, and one or more transverse reinforcement bars 15 forming a part of the back wall structure which includes a panel 16.

The mirror 10 is shown as comprising a frame having the vertical side rails 17 and top and bottom rails 18 and set in this frame in known manner is the glass mirror panel 19.

For the support of the framed structure or mirror 10 by means of the improved mounting units or mounting brackets hereinafter described, there are employed the vertical posts or standards 20 which are disposed in spaced parallel relation with the lower ends thereof extending across the back edge of the top 13 and the reinforcing bar 15 and secured to these parts in a suitable manner as, for example, by means of screws 21a or any other fasteners which will hold the posts or standards 20 rigidly in vertical position.

For facilitating the use of the hereinafter described mirror supporting or hinge bracket units, the posts 20 are arranged so that the spacing between the remote sides of the same is considerably less than the spacing between the inner sides of the vertical side rails 17 of the mirror frame. While the posts or standards 20 may be formed of any suitable material, it is preferred that they be of special laminated construction. These posts which may be of rectangular cross section are preferably made up of alternately placed laminations 21 of wood of different moisture absorbing characteristics and placed with the grain of all of the laminations running lengthwise of the post mounted or arranged so that the laminations lie in planes paralleling the back of the mirror, as illustrated in Fig. 3.

For the purpose of stiffening or assisting in rigidifying the posts or standards 20, each post has secured along the back outer corner a steel angle bar 22 and this bar is given added stiffness by having the edge of the outer corner dimpled, as indicated at 23, the dimples being placed at intervals of an inch or so apart. Thus it will be seen that one flange of the angle iron will lie against the outer side face of each post 20 in a plane perpendicular to the edges of the laminations 21, while the other flange will lie against the rear face of the rearmost lamination of the post.

The mirror supporting device of the present invention in generally designated 24 and in mounting the mirror 10 upon the posts 20, four of these supports are employed, there being one upon the outer side of each post 20 adjacent to the top of the latter, and one upon the outer side of each post 20 just above the top 13 of the article of furniture to which the posts are secured. These upper and lower supports or hinge bracket units 24 are vertically spaced a distance materially less than the distance between the top and bottom rails 18 of the mirror behind which the units are located.

Each of the vertical side rails 17 of the mirror frame has secured thereto and extending lengthwise thereof a mounting block 25, such securing means being of any suitable character, such as by means of the screws 26 or the like, and the hereinbefore referred to separation or space between the posts 20 is calculated so as to permit the hinge bracket units or mirror support units 24 to be interposed for proper operation between the mounting blocks 25 and the outer sides of the adjacent posts.

As will be seen from reference to Fig. 1, which is a back view of the mirror and which shows the four mirror supporting or hinge bracket units coupled between the mounting blocks and the posts 20, all of the bracket units are of duplicate construction but are mounted so that the lower ones are in the reverse position from the upper units. It will accordingly be obvious that a description of one of the mirror supporting or hinge bracket units will apply to all of those shown and in this connection attention may be directed particularly to Fig. 4 in which one of the units is illustrated in perspective.

The mirror support unit 24 comprises an elongate plate 27 which may be formed of suitable flat bar or strap metal. Adjacent to one end of the plate 27 and located a substantial distance inwardly from the other end thereof is an opening 28 adapted to receive a securing device such as a screw or the like by which the plate is fixed in operative position against the outer side of a supporting post or standard 20.

The numerals 29 and 30 designate respectively the front and back edges of the plate 27 and the numeral 31 designates the outer face of the plate.

Projecting outwardly from the outer face 31 and located at the back edge 30 of the plate 27 is a flange 32 which is formed integrally with a slotted plate or fork 33 which is in spaced parallel relation with the face 31 of the plate 27 to form a recess or box 34. The slots of the plate 33 is designated 35 and the two members or tines 36 which define the slot are extended in the same direction as the front edge 29 faces.

The numeral 37 generally designates a hinge arm which is also formed of flat or straplike material like the plate 27. This arm is considerably shorter than the plate 27 and has a short portion 38 of one end in offset parallel relation with the remainder or longer portion 39. This offset portion 38 is positioned flat against the face 31 of the plate 27 and is pivotally attached thereto by the bolt 40 which has a portion of the shank thereof screw threaded as indicated at 41 and threadably engaged in an aperture in the plate 27. The portion of the bolt shank between the threads 41 and the head of the bolt is unthreaded where it passes through an aperture 42 in the offset portion 38 of the hinge arm so that the arm may turn freely on the bolt and there is interposed between the portion 38 of the hinge arm and the head of the bolt 40 a spring washer 43 which yieldably maintains the offset portion 38 of the arm firmly against the outer face 31 of the plate 27 as shown.

As will be obvious, the arm 37 turns on the bolt and it is placed so that the longer portion 39 will be spaced by the offset 38 so that the free end of the arm 37 when swung into parallel relation with the plate 27 will slide over or be located against the outer face of the slotted plate 33.

The free outer end of the arm 37 is provided with an elongate slot 44 which extends in the direction of the length of a hinge arm on the longitudinal center thereof for the reception of a headed pin 45, the head of which is designated 46. This pin may be in the form of a round head screw which is used to couple the slotted or free end of the hinge arm 37 with the inner side of a mounting block 25 in the manner about to be described.

In the use of the mirror support or hinge bracket unit, one unit is mounted upon the outer side of the top end portion of each standard or post 20 by having the plate 27 positioned against the outer side of the post, with the slotted plate 33 uppermost or at the top of the unit and with the slot 35 directed forwardly or toward the back of the mirror. The plate 27 is secured to the post by screws or the like passed through the apertures 28. The hinge arm 37 is coupled at its slotted end with the inner side of the adjacent mounting block 25 by the pin or screw 45 and when the arm 37 is vertical and parallel with the plate 27, the pin or screw 45 will be located in the end of the slot 44 remote from the free end of the hinge arm 37.

The two lower mirror supports or hinge bracket units 24 are secured in exactly the same manner to and between the posts and the adjacent mounting blocks 25, with the exception that the lower units 24 are inverted from the position of the upper units.

When the two mirror supports or hinge bracket units 24 are attached by the plates 27 to a supporting post 20, the back edge 30 of the plate 27 will be butted against the adjacent edge of the reinforcing angle iron 22. The angle irons or angle bars 22 thus, in addition to adding rigidity to the post, will also brace the bracket units and while the units are here illustrated as being separate from the angle bars, they may be joined by welding or otherwise to the abutting edges of the angle bars, if desired, whereby to obtain a single mounting structure comprising an angle bar and an upper and lower bracket unit.

From the foregoing description, and as will be seen upon reference to the several figures of the drawings, the bracket units when installed between the outer sides of the supporting posts and the mounting blocks 25 which are secured to the rear of the side rails 17 of the frame, will permit the mirror to be swung into forwardly inclined position, as illustrated in Fig. 2. In this action of swinging the top of the mirror forwardly so that the mirror will be tipped as shown, the hinge arms swing out on the supporting screws or bolts 40 and the pins or screws 45 shift from the inner ends of the slots 44 to the outer ends thereof, while at the bottom of the mirror the pins or screws 45 remain in the slot or fork of the adjacent slotted plate 33. When the mirror is shifted back and into vertical position, the pins or screws 45 of the top units and those of the bottom units 24 all enter their respective slots 35 and when the bottom part of the mirror is pulled out so that it will slope back as shown in Fig. 4, the reverse situation obtains from that shown in the first mentioned figure, which is that the slotted downwardly directed free ends of the hinge arms 37 swing out on their pivots while the upper hinge arms remain perfectly vertical.

In a fourth position for the mirror the entire mirror structure may be pulled forwardly so as to swing the hinge arms 37 of the upper and lower units out as shown in Fig. 5, and here the pivot pins or screws 45 will be located in the outer ends of the slots 44, as shown.

In any one of the several positions to which the mirror may be swung or moved, the hinge bracket units, because of their novel design and the manner in which they are mounted, will function to firmly or securely hold the mirror against accidental displacement from its set position.

It will be apparent from the foregoing description and from the views illustrating the several positions in which the mirror may be placed, that the hinge mounting units will permit the mirror, when shifted rearwardly from the position shown in Fig. 5, to stand flush with the rear edge of the supporting furniture body and with the faces of the supporting standards, both at the top and the bottom.

Also the box-like housing having the slotted wall 33 and functioning as a catch for the adjacent mirror carried headed stud will operate to prevent the top of the mirror from swinging back against the wall, or vice versa.

While the supporting standards for the mirror have been illustrated and described as being attached to the back of the piece of furniture or the case, by screws, it will be understood that this manner of mounting the supports may have substituted therefor any other type of mounting or securing means, such as wrap-around brackets or by any other suitable means.

I claim:

1. A support unit of the character described comprising a mounting plate, means for securing the plate to a support, an elongate hinge arm, means pivotally coupling an end of said arm to a face of the plate for turning in a plane parallel with said face, said arm having a slot extending longitudinally therein adjacent to its other end and adapted to receive the shank of a headed stud carried by a structure such as a mirror to be supported by the unit on the support, and means carried by said plate for engagement with the shank of the headed stud carried by the structure when the arm is pivoted into parallel relation with the plate.

2. The invention according to claim 1, wherein the said means forms an interlocking engagement between the headed stud and the plate and limits the turning of the arm in one direction.

3. The invention according to claim 1, wherein said means embodies a recess in which the stud is received to form an interlocking coupling between the headed stud and the plate when the arm is pivoted into said parallel relation with the plate to limit the turning of the arm in one direction.

4. The invention according to claim 1, wherein the said means embodies a box-like housing carried by the plate in a position to lie between the slotted end of the arm and the plate when the arm is pivoted into said parallel relation with the plate and the housing having a side portion formed with a recess into which the shank of the headed stud is received when the arm is in the said relation with the plate.

5. The invention according to claim 4, wherein said arm has a portion of that end which is pivotally coupled with the plate in offset substantially parallel relation with the remaining portion of the arm whereby said remaining portion will be offset from the plate to facilitate disposition of the slotted end of the arm against the adjacent side of the recessed portion of the housing.

6. Supporting means for and in combination with a body such as a mirror and the like having frame side members, said supporting means comprising a pair of vertical parallel standards, the standards being positioned to have their remote sides spaced apart a distance materially less than the distance between the frame side members of the supported body, a hinge unit secured to each of said remote sides of the standards adjacent to the top thereof, a hinge unit secured to each of said remote sides of the standards at a substantial distance below the first mentioned units, each of said units comprising a plate portion fixed against the adjacent standard and an arm portion pivotaly attached at one end to the plate portion, the said arm portion of each unit having its other end in offset relation with the plate portion to which it is attached and having a longitudinal slot therein, and a stud member fixed to each frame side member for sliding pivotal engagement in the slot of an adjacent pivoted arm.

7. The invention according to claim 6, wherein the slotted ends of the arms of those units attached adjacent the top ends of the standards are directed upwardly and the slotted ends of the arms of the lower units are directed downwardly.

8. The invention according to claim 6, with means carried by the plate of each unit for receiving the adjacent frame carried stud to form a locking coupling between the stud and the standard supported plate.

9. The invention according to claim 7, with means carried by the plate of each unit for receiving the adjacent frame carried stud to form a locking coupling between the stud and the standard supported plate.

10. The invention according to claim 6, with means forming an interlocking coupling between each stud and the adjacent plate comprising a flat element secured in offset parallel relation with the unit plate on the side thereof nearest to the arm, and a recess formed in an edge of the said flat element into which the adjacent stud slides when the arm is moved into parallel relation with the plate to which it is pivotally attached.

11. The invention according to claim 6, with mounting members secured to the rear sides of the said frame side members and said studs being attached to the frame side members by engagement in the sides of the mounting members nearest to the supporting standards.

12. The invention according to claim 6, wherein said standards are formed of a plurality of laminations lying in planes parallel with a vertical plane extending across the width of the space between the standards.

13. The invention according to claim 12, wherein said standards are of rectangular cross section, and an angled reinforcing bar secured to each standard along the rear outer corner thereof.

No references cited.